US012737363B2

(12) United States Patent
Li et al.

(10) Patent No.: US 12,737,363 B2
(45) Date of Patent: Sep. 15, 2026

(54) DATA QUERY METHOD AND DEVICE, STORAGE DEVICE, AND ELECTRONIC DEVICE

(71) Applicant: Samsung Electronics Co., Ltd., Suwon-si (KR)

(72) Inventors: Yutao Li, Xi'an (CN); Shuaijun Wu, Xi'an (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/744,038

(22) Filed: Jun. 14, 2024

(65) Prior Publication Data

US 2024/0427771 A1 Dec. 26, 2024

(30) Foreign Application Priority Data

Jun. 21, 2023 (CN) ......................... 202310745081.7

(51) Int. Cl.
*G06F 15/16* (2006.01)
*G06F 16/2455* (2019.01)

(52) U.S. Cl.
CPC .............................. *G06F 16/24552* (2019.01)

(58) Field of Classification Search
None
See application file for complete search history.

(56) References Cited

U.S. PATENT DOCUMENTS 9,804,988 B1 10/2017 Ayoub et al.
2008/0209120 A1 8/2008 Almog et al.
2013/0290320 A1* 10/2013 Zhu ......................... G06F 16/95 707/723

(Continued)

FOREIGN PATENT DOCUMENTS

CN 103001964 A 3/2013
CN 107291399 A 10/2017
CN 107038206 B 4/2021

OTHER PUBLICATIONS

RocksDB, https://web.archive.org/web/20210415113828/https://docs.pingcap.com/tidb/stable/rocksdb-overview/, Apr. 15, 2021 pp. 1-12 (Year: 2021).*

(Continued)

*Primary Examiner* — Alex Gofman
(74) *Attorney, Agent, or Firm* — HARNESS, DICKEY & PIERCE, P.L.C.

(57) ABSTRACT

Disclosed are a data query method, a data query device, a storage device, and an electronic device. The data query method comprises: receiving a data query request carrying a keyword associated with data to be queried; querying the keyword in the main cache, wherein ordered views that have been accessed historically are stored in the main cache and each of the ordered views comprises a plurality of historical keywords; in a case that a historical keyword matching the keyword is not found in the main cache, querying the data corresponding to the keyword in the hard disk and the memory based on the keyword and obtaining the data to be queried; and in a case that a historical keyword matching the keyword is found in the main cache, querying the data corresponding to the keyword in the memory based on the keyword and obtaining the data to be queried.

20 Claims, 13 Drawing Sheets

(56) References Cited

U.S. PATENT DOCUMENTS

| | | | | |
|---|---|---|---|---|
| 2016/0019279 | A1 | 1/2016 | Sengupta et al. | |
| 2016/0140214 | A1* | 5/2016 | Musuluri | G06F 16/951 707/767 |
| 2016/0378826 | A1* | 12/2016 | Bensberg | G06F 16/24552 707/721 |
| 2021/0081434 | A1* | 3/2021 | Dombroski | G06F 16/282 |
| 2021/0303192 | A1* | 9/2021 | Duttagupta | G06F 16/9027 |

OTHER PUBLICATIONS

Huanchen Zhang, et al. "SuRF: Practical Range Query Filtering with Fast Succinct Tires," SIGMOD, No. 18, pp. 1-14 (2018).
Wenshao Zhong, et al. "Remix: Efficient Range Quary for LSM-trees," The Advanced Computing Systems Association, 978-1-939133-20-5, pp. 1-15 (2021).
Siqiang Luo, et al. "Rosetta: A Robust Space-Time Optimized Range Filter for Key-Value Stores," Research 23: OLAP, Data Warehouses, and Key-Value Stores, SIGMOD, No. 20, pp. 1-16 (2020).
Ting Yao, et al. "MatrixKV: Reducing Write Stalls and Write Amplification in LSM-tree Based KV Stores with Matrix Container in NVM," The Advanced Computing Systems Association, 978-1-939133-14-4, pp. 1-16, (2020).
Zhichao Cao, et al. "Characterizing, Modeling, and Benchmarking RocksDB Key-Value Workloads at Facebook," The Advanced Computing Systems Association, 978-1-939133-12-0, pp. 1-17, (2020).
"The Challenge of Keeping Up with Data," https://www.intel.cn/content/www/cn/zh/products/docs/memory-storage/optane-persistent-memory/optane-dc-persistent-memory-brief.html, pp. 1-6. (2019).
Hiwot Tadese Kassa, et al. "Improving Performance of Flash Based Key-Value Stores Using Storage Class Memory as a Volatile Memory Extension," The Advanced Computing Systems Association, 978-1-939133-23-6, pp. 1-18, (2021).
Extended European Search Report dated Sep. 20, 2024 issued in European Patent Application No. 24167301.1-1203.
Dong, et al. "RocksDB: Evolution of Development Priorities in a Key-value Store Serving Large-scale Applications", ACM Transactions on Storage, vol. 17, No. 4, pp. 1-32, XP0932037 41, (2021).
Shah Niket: "B+ Tree in Key-Value store", XP093203739, Retrieved from the Internet: URL:https://niks36.medium.com/b-tree-in-key-value-store-4584a9421500 (2023).
Grigorik, "SSTable and Log Structured Storage: LevelDB", XP093203498, Retrieved from the Internet: U RL:https://www.igvita.com/201 2/02/06/sstable-and-log-structured-storag••leveldb/ (2012).

* cited by examiner

FIG. 2

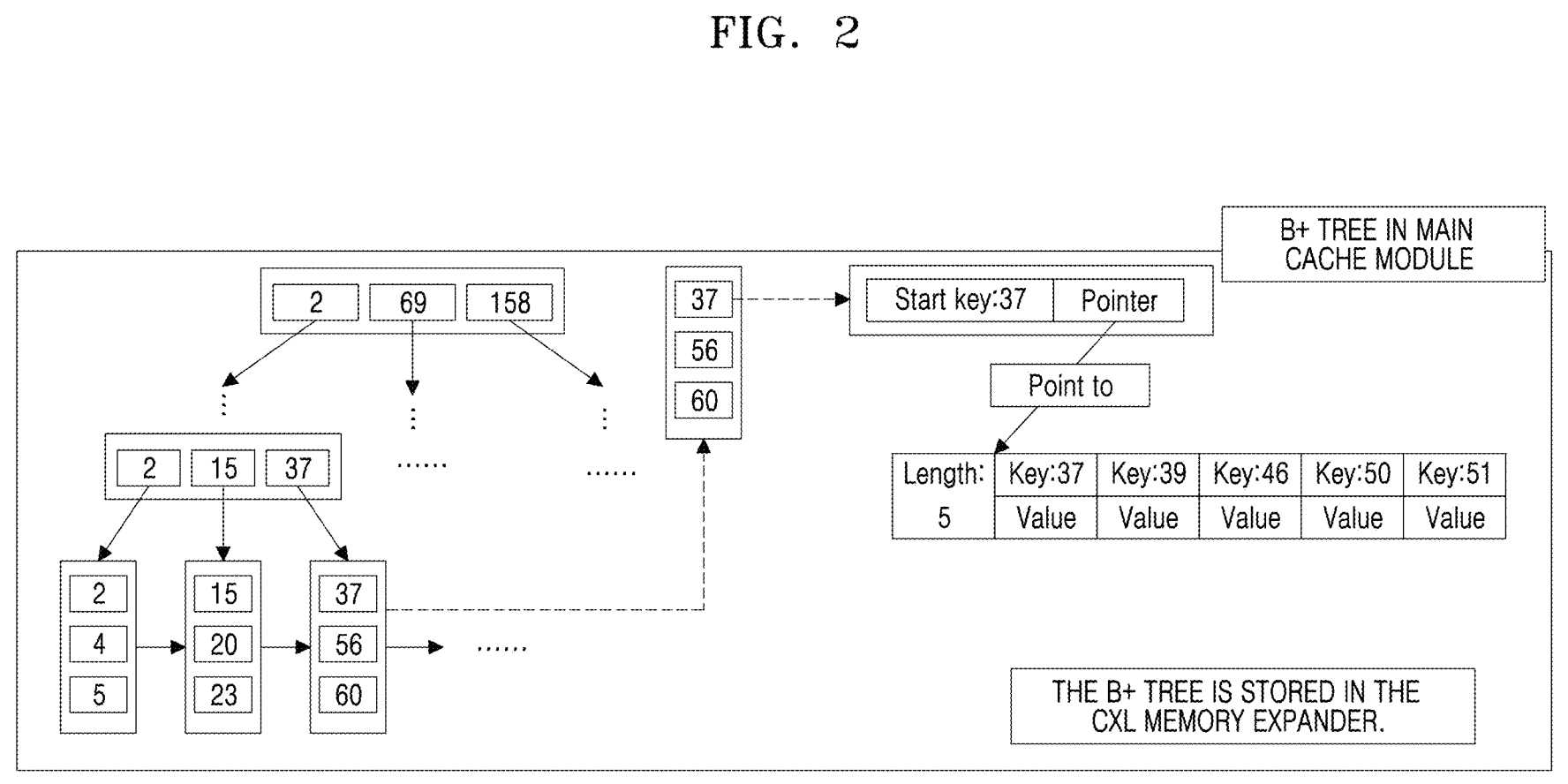

B+ TREE IN MAIN CACHE MODULE

Start key:37
Pointer
Point to
Length: 5
Key:37 Value
Key:39 Value
Key:46 Value
Key:50 Value
Key:51 Value

THE B+ TREE IS STORED IN THE CXL MEMORY EXPANDER.

FIG. 12

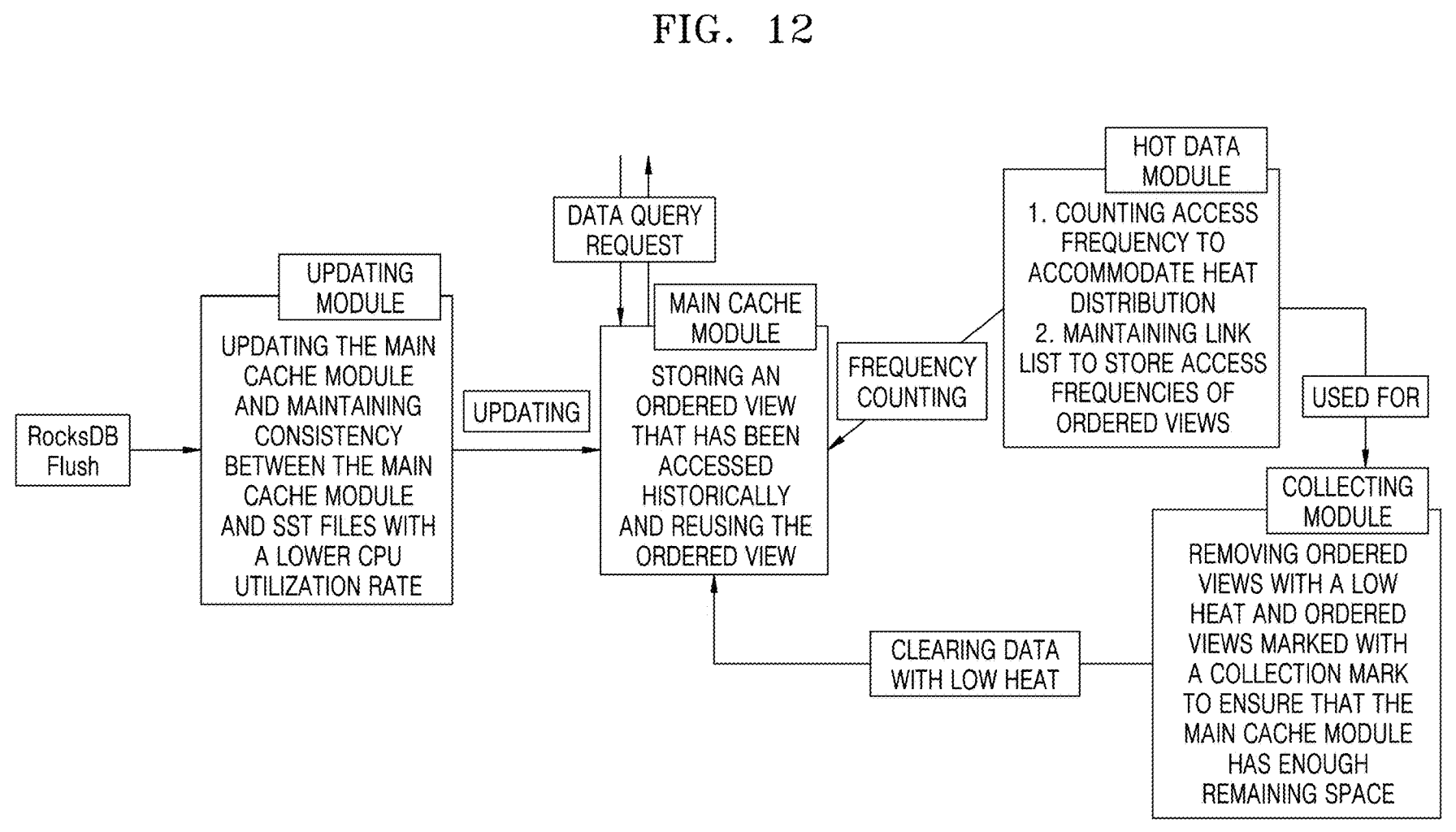

RocksDB Flush

UPDATING MODULE

UPDATING THE MAIN CACHE MODULE AND MAINTAINING CONSISTENCY BETWEEN THE MAIN CACHE MODULE AND SST FILES WITH A LOWER CPU UTILIZATION RATE

UPDATING

DATA QUERY REQUEST

MAIN CACHE MODULE

STORING AN ORDERED VIEW THAT HAS BEEN ACCESSED HISTORICALLY AND REUSING THE ORDERED VIEW

FREQUENCY COUNTING

HOT DATA MODULE

1. COUNTING ACCESS FREQUENCY TO ACCOMMODATE HEAT DISTRIBUTION
2. MAINTAINING LINK LIST TO STORE ACCESS FREQUENCIES OF ORDERED VIEWS

USED FOR

COLLECTING MODULE

REMOVING ORDERED VIEWS WITH A LOW HEAT AND ORDERED VIEWS MARKED WITH A COLLECTION MARK TO ENSURE THAT THE MAIN CACHE MODULE HAS ENOUGH REMAINING SPACE

CLEARING DATA WITH LOW HEAT

DATA QUERY METHOD AND DEVICE, STORAGE DEVICE, AND ELECTRONIC DEVICE

CROSS-REFERENCE TO RELATED APPLICATIONS

This application is based on and claims priority under 35 U.S.C. § 119 to Chinese Patent Application No. 202310745081.7, filed on Jun. 21, 2023 in the China National Intellectual Property Administration, the disclosure of which is incorporated by reference herein in its entirety.

BACKGROUND

Various example embodiments relate to data storage technologies and, more specifically, to one or more of a data query method and device, a storage device, and an electronic device.

An Open-source RocksDB is or includes a database for storing and/or accessing hundreds of petabytes (PBs) of data. The RocksDB is used as an open storage database for Facebook, and the RocksDB is or corresponds to an embedded Key-Value (KV) type database written in the C++ programming language, upon which data exists as Sorted Sequence Table (SST) files. Currently, when querying data on the RocksDB, the querying is performed by constructing a min heap, but this querying may involve traversing multiple SST files at multiple levels, which may lead to a number of I/Os, and this heap-based approach may also cost extra CPU loss. Moreover, since a system cannot predict where the next key is located, the I/Os from this querying are likely to be random I/Os, which may further slowdown querying speed, and thus the cost of building a local ordered view by this method may be high. Alternatively or additionally, after the querying, even if the ordered view that has been used will be used again in subsequent accesses, the local ordered view may be abandoned, and thus the RocksDB still needs to or is expected to reconstruct the ordered view, which may cause a lot of unnecessary waste of resources.

SUMMARY

Various example embodiments provide a data query method and device, a storage device, and an electronic device, so as to at least help to solve a problem for waste of resources.

According to some example embodiments, there is provided a data query method, wherein the data query method is applied to a storage device including a memory, a hard disk and a main cache, the data query method includes: receiving a data query request carrying a keyword associated with data to be queried; querying the keyword in the main cache, wherein ordered views that have been accessed historically are stored in the main cache and each of the ordered views includes a plurality of historical keywords; in response to a historical keyword matching the keyword not being found in the main cache, querying the data corresponding to the keyword in the hard disk and the memory based on the keyword and obtaining the data to be queried; and in response to a historical keyword matching the keyword is found in the main cache, querying the data corresponding to the keyword in the memory based on the keyword and obtaining the data to be queried.

Alternatively or additionally according to some example embodiments, there is provided a storage device, wherein the storage device includes a memory, a hard disk and a main cache, wherein the main cache is configured to store ordered views that have been accessed historically and each of the ordered views includes a plurality of historical keywords, so that in response to data being queried, a keyword associated with the data to be queried is queried first in the main cache, the hard disk is configured to store keywords and data corresponding to the keywords, and the memory is configured to store keywords and data corresponding to the keywords.

Alternatively or additionally according to some example embodiments, there is provided a data query device, wherein the data query device is applied to a storage device including a memory, a hard disk and a main cache, the data query device includes: a receiving circuit configured to receive a data query request sent by a sender, wherein the data query request carries a keyword associated with the data to be queried, a querying circuit configured to query the keyword in the main cache, wherein ordered views that have been accessed historically are stored in the main cache and each of the ordered views includes a plurality of historical keywords, a first obtaining circuit configured to query the data corresponding to the keyword in the hard disk and in the memory based on the keyword and obtaining the data to be queried, in response to a historical keyword matching the keyword not being queried in the main cache, and a second obtaining circuit configured to query data corresponding to the keyword in the memory based on the keyword and obtain the data to be queried, in response to the historical keyword matching the keyword being queried in the main cache.

BRIEF DESCRIPTION OF THE DRAWINGS

The above and other purposes and features of various example embodiments will become more apparent from the following description, taken in conjunction with the accompanying drawings schematically illustrating the embodiments, in which:

FIG. 2 is a schematic diagram of a structure of a main cache module according to some example embodiments; FIG. 12 is a schematic diagram of relationships between modules according to some example embodiments.

DETAILED DESCRIPTION

The following detailed description is provided to assist in gaining a comprehensive understanding of the methods, apparatuses, and/or systems described herein. However, various changes, modifications, and/or equivalents of the methods, devices, and/or systems described herein will be apparent after an understanding of the disclosure of the present disclosure. For example, the sequence of operations described herein are merely examples, and are not limited to those set forth herein, but may be changed, as will be apparent after an understanding of various example embodiments, with the exception of operations necessarily occurring in a certain order. In addition, descriptions of features that are known in the art may be omitted for increased clarity and conciseness.

The features described herein may be implemented in different forms, and should not be construed as being limited to the examples described herein. Rather, the examples described herein have been provided merely to illustrate some of many possible ways of implementing the methods, devices, and/or systems described herein that will be apparent after an understanding of the disclosure of the present disclosure.

The terminology used herein is only for describing various examples, and will not to be used to limit the disclosure. The articles "a," "an," and "the" are intended to include the plural forms as well, unless the context clearly indicates otherwise. The terms "comprise", "include" and "have" specify the presence of stated features, integers, operations, components, elements, and/or combinations thereof, but do not exclude the presence or addition of one or more other features, integers, operations, components, elements, and/or combinations thereof.

Unless otherwise defined, all terms (including technical terms and scientific terms) used herein have the same meanings as commonly understood by those skilled in the art to which the present disclosure belongs after understanding the disclosure of the present disclosure. Terms (such as those defined in general dictionaries) should be interpreted as having a meaning consistent with their meaning in the context of the relevant art and in the present disclosure, and should not be interpreted in an idealized or overly formal sense unless expressly so defined herein.

In addition, in the description of the examples, detailed description of well-known relevant structures or functions may be omitted, for example, when it is deemed that such description will cause ambiguous interpretation.

Figure 1:
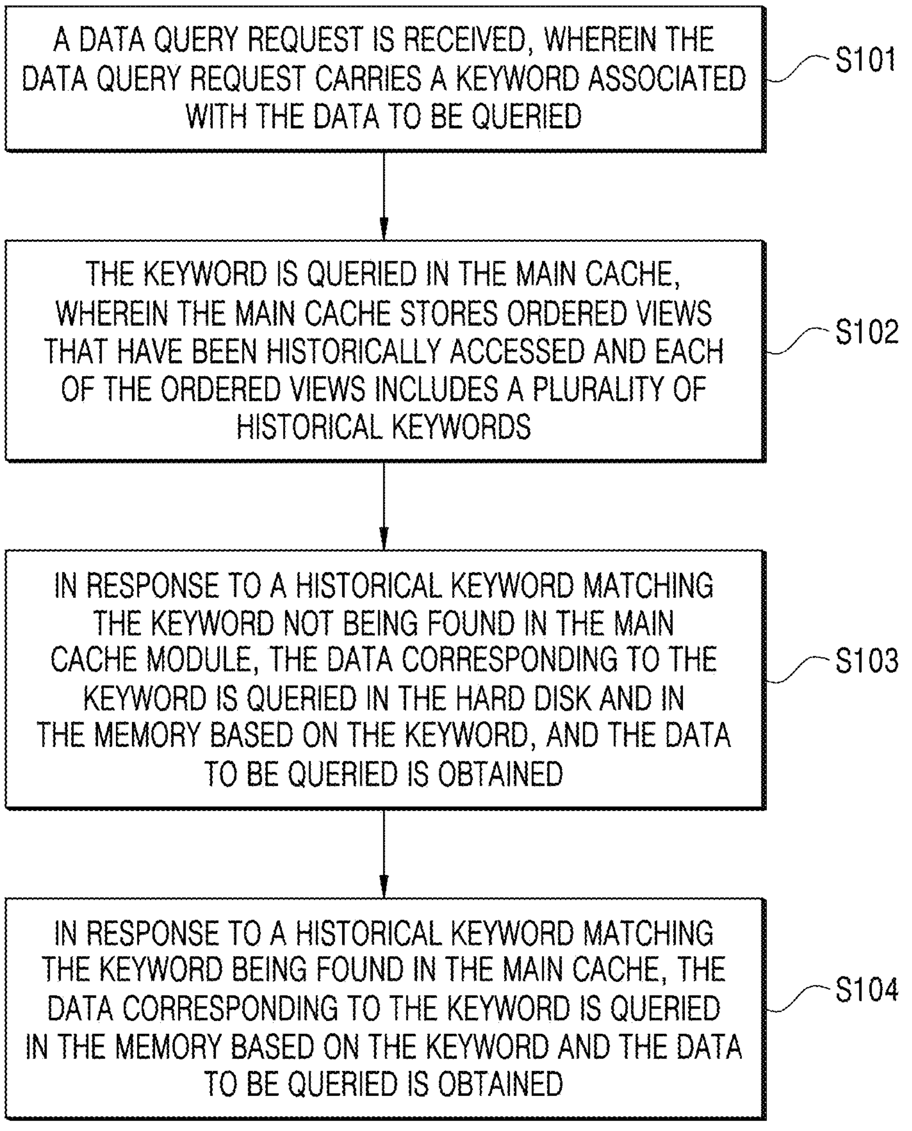
FIG. 1 is a flowchart of a data query method according to some example embodiments.

According to some example embodiments, there is provided a data query method, wherein data query method is applied to a storage device, the storage device comprises a memory, a hard disk, and a memory expander comprising a main cache or main cache module. FIG. 1 illustrates a flowchart of a data query method according to some example embodiments.

Referring to FIG. 1, in operation S101, a data query request is received, wherein the data query request carries a keyword associated with the data to be queried. Example embodiments may be applied to RocksDB, which is or includes an open storage database for Facebook, and which is an embedded Key-Value (KV) type database written in the C++ programming language, so the keyword carried may be the Key and the data to be queried may be the Value. It should be noted that the query request may or may essentially carry a keyword that is the next keyword for the data to be queried. For example, the next keyword of the keyword carried in the query request is the keyword corresponding to the data to be queried, but example embodiments are not limited to this, and the keyword corresponding to the data to be queried may also be carried directly.

In operation S102, the keyword is queried in a main cache or main cache module, wherein the main cache module stores ordered views that have been accessed historically, e.g. recently, and each of the ordered views includes a plurality of historical keywords.

In various example embodiments, each of the ordered views also includes data corresponding to the plurality of historical keywords. According to some example embodiments, what is stored in the ordered view may not be an index of the data but may be the specific data; for example, what is stored in the ordered view may no longer an offset address of the data and/or a hash of the data but the data itself, so the ordered view is not updated during most compactions, which may help avoid or reduce the propensity of updating problems. Because the ordered view in the related technology stores the global index of the data corresponding to the keyword, and the global index needs to or is expected to be updated constantly during the compactions, a large Memory Table (Memtable) may be used to reduce the number of compactions, but such an approach may cause more serious write stall problems.

According to some example embodiments, however, the ordered views that have been historically accessed are stored in the main cache module in a form of a B+ tree. According to some example embodiments, storing the ordered views in the form of B+ trees ensures or helps to ensure that each data is read in a similar amount of time and, e.g., is read quickly.

For example, taking the memory expander as a Compute Express Link (CXL) memory expander, FIG. 2 is a schematic diagram of a structure of the main cache module according to some example embodiments. As shown in FIG. 2, the main cache module uses a B+ tree to store historical access records, e.g., historically accessed ordered views, and KV pairs are stored in ordered views on the B+ tree's leaf nodes, rather than the offset addresses of the KV pairs, and a first key of an ordered view may be used as an index of the B+ tree; example embodiments are not limited thereto.

In operation S103, in a case that a historical keyword matching the keyword is not found in the main cache module, the data corresponding to the keyword is queried in the hard disk and in the memory based on the keyword, and the data to be queried is obtained. In this operation, the data corresponding to the keyword may be queried in the hard disk first and then queried in the memory, or the data corresponding to the keyword may be queried in the memory first and then queried in the hard disk, or the data corresponding to the keyword may be queried in the hard disk and the memory at the same time or at overlapping times; example embodiments are not limited thereto. Generally, a result of the querying in the memory may often prevail, because data stored in the memory may be the latest data, and when the data to be queried is not found in the memory, a result of the querying in the hard disk may prevail. When example embodiments are used in a RocksDB, the hard disk may be or may include SST files, and the memory may be or may include a Memtable; example embodiments are not limited thereto.

In various example embodiments, in a case that data corresponding to the keyword being found in the memory, the data corresponding to the keyword may be used as the data to be queried. According to some example embodiments, since the data in the memory is the latest or most recent, the latest data may be obtained based on a query result for the memory.

In some example embodiments, in a case that the historical keyword matching the keyword is not found in the main cache module, after obtaining the data to be queried, the ordered view corresponding to the keyword may be obtained in the hard disk and/or the memory based on the keyword, and the ordered view may be stored in the main cache module. According to some example embodiments, when the keyword of the data to be queried is not included in the main cache module, the ordered view corresponding to the keyword is obtained in the hard disk and/or the memory and updated to the main cache module to ensure that data in the main cache module is rich.

For example, suppose that a keyword Key is 37; when the keyword is not found in the main cache module, a number such as a specific (or, alternatively, predetermined) number of Keys prior to 37 or another number of Keys following 37 may be obtained to generate an ordered view, and then the generated ordered view is stored in the main cache module, so that KV pairs in the ordered view in the main cache module are directly queried when the KV pairs in the ordered view are accessed later, without generating the corresponding ordered view again.

In some example embodiments, a specific or predetermined number of target keywords may be obtained in the hard disk based on the keyword. The target keyword includes the keyword and the target keywords are ordered and the specific or predetermined number is less than a particular such as dynamically determined (or, predetermined) threshold; and an ordered view corresponding to the keyword may be constructed based on the specific number of target keywords. According to the present embodiment, the ordered view being too long leads to an uneven heat distribution of the ordered views may be avoided. The present disclosure counts heats by the ordered view, and thus if one ordered view is too long and contains too much data, it is difficult to count a relatively accurate heat of the one ordered view.

Figure 3:
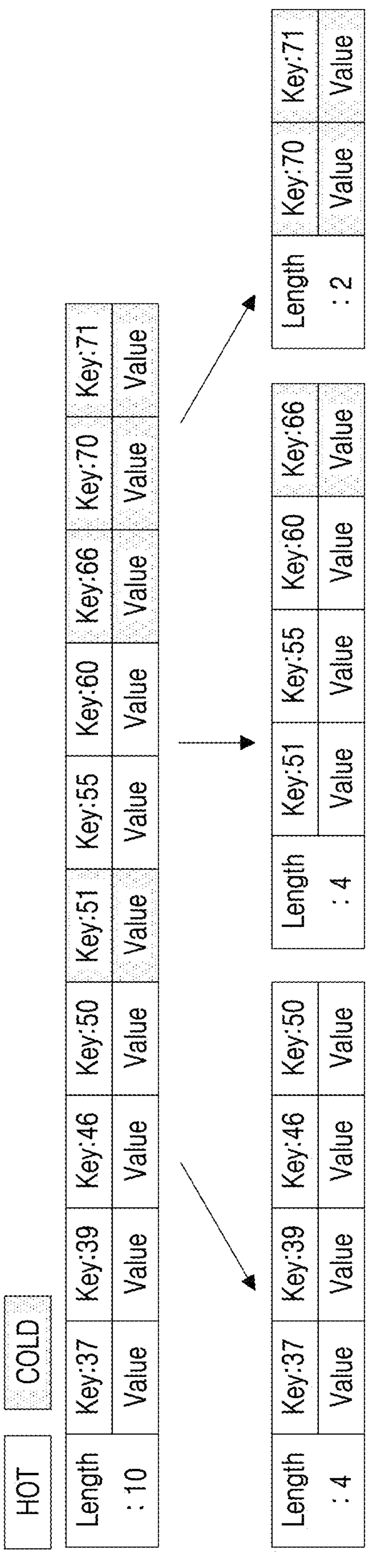
FIG. 3 is a schematic diagram of splitting operations for an ordered view according to some example embodiments.

For example, the smallest unit of heat statistics is or corresponds to the ordered view rather than the Key; there may be a problem of an uneven heat distribution in ordered views, and this problem may lead to deviation in heat statistics and/or affect operation efficiency, such that overly long ordered views are generally be split. As shown in FIG. 3, this splitting operation may improve accuracy of heat statistics, but may bring extra CPU consumption. Accordingly, various example embodiments may limit the number of keywords in the ordered view when generating the ordered view, such as by setting a specific (dynamic or predetermined) threshold to control the number of keywords in the ordered view. For example, it may still assumed that the keyword Key is 37 and the threshold is four (4), e.g., the length of the ordered view is four (4). At this time, four Keys prior to the 37 or four Keys following the 37 may be obtained to generate the ordered view corresponding to the keyword Key.

In various example embodiments, in a case that content in the memory is written to the hard disk, a proportion of the specific (predetermined or dynamically determined) keywords to all keywords in the memory may be obtained, wherein the specific keywords are keywords that are not in the hard disk; in a case that the proportion exceeds a first threshold, an ordered view corresponding to the specific keywords in the main cache module is marked with a collection mark, and data corresponding to keywords other than the specific keywords in the memory is updated to the main cache module; however, in a case that the proportion does not exceed the first specific threshold, the specific keywords are inserted into a corresponding ordered view in the main cache module, and the data corresponding to the keywords other than the specific keywords in the memory is updated to the main cache module. According to various example embodiments, in order to prevent or reduce the likelihood of some ordered views from being too long caused by inserting too much new data and an extra CPU consumption caused by splitting the ordered views, when updating all the data in memory to the main cache module, example embodiments may detect a proportion of new data when the data in the memory is written to the hard disk, and when the proportion of new data is higher, the ordered view corresponding to the new data (such as the ordered view to be inserted) is marked as being collected and will be collected subsequently, and then new ordered views are re-introduced from the hard disk, and the introduced ordered views are not too long, e.g. due to a length limit.

Figure 4:
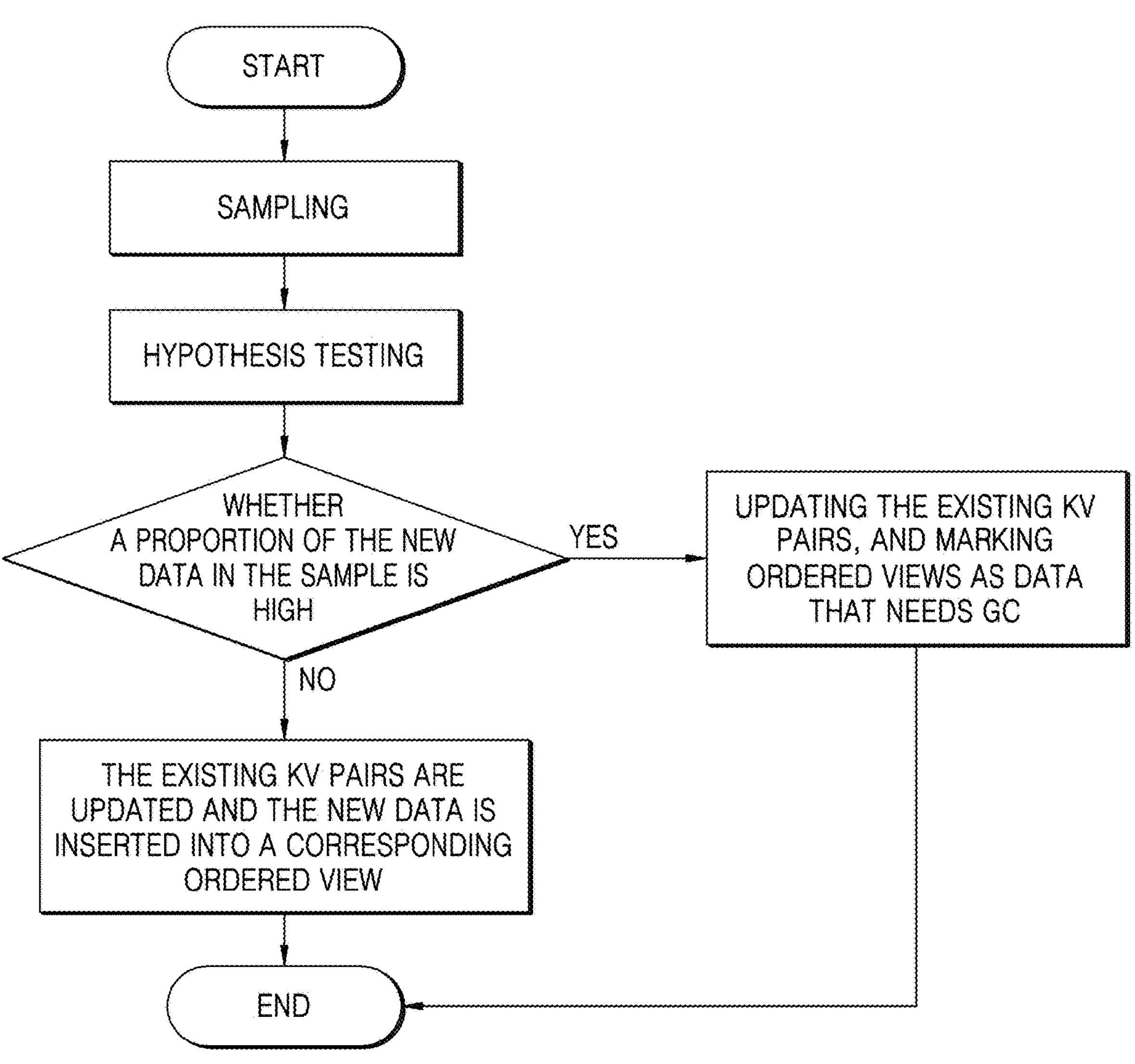
FIG. 4 is a flowchart of an updating operation according to some example embodiments.

For example, when writing data of the memory (e.g., a Memtable) to the hard disk, data in the main cache module may also be updated, and there may be two main types of actions in the main cache module at this time, one is adding of new data and the other is the updating of existing data (while deletion may be considered as special updating). As mentioned above, the ordered view is split when the ordered view is too long, which may improve the accuracy of the heat statistics, but may bring an extra CPU consumption, so example embodiments may evaluate the extra consumption brought by new data added to the main cache module. For example, various example embodiments may predict a proportion of new data in the memory (e.g. a Memtable) by using hypothesis testing. FIG. 4 is a flowchart of an updating operation according to some example embodiments, as shown in FIG. 4, and when data in the memory (e.g., in the Memtable) is written to the hard disk, the data in the memory is sampled. Taking one of the samples as an example, a hypothesis testing is performed for the one sample to judge the one sample. When the proportion of the new data in the one sample is high (e.g., the proportion exceeds the specific threshold), only existing KV pairs in the main cache module are updated according to data in the memory, and ordered views involved by the new data in the memory are marked as data that needs GC (garage collection). When the proportion of the new data is low (e.g., the proportion does not exceed the specific threshold), the existing KV pairs in the main cache module may be updated based on the data in the memory and the new data may be inserted into a corresponding ordered view in the main cache module.

It should be noted that the above hypothesis testing may also be implemented by the following equation (Equation 1):

$$z = \frac{\overline{p} - p_t}{\sqrt{\frac{p_t(1 - p_t)}{n}}} \text{ rejection region } (z_\alpha, +\infty),$$

wherein $p_t$ is a first specific threshold, $\overline{p}$ is the proportion of the new data in the sample, n is a size of the sample, and $Z_\alpha$ is another threshold (e.g., set by a user and/or dynamically set).

In operation S104, in a case that the historical keyword matching the keyword is found in the main cache module, the data corresponding to the keyword is queried in the memory based on the keyword and the data to be queried is obtained. In this operation, when the historical keyword matching the keyword is found in the main cache module, it may still be necessary or desirable to further query the memory because the latest data is stored in the memory, and when the main cache module is queried alone, it may be likely that the data in the memory has not yet been updated to the main cache module, resulting in an inaccurate query result. Thus, even when the historical keyword matching the keyword is found in the main cache module, it may still be necessary or desirable to further query the memory.

In various example embodiments, in a case that the data corresponding to the keyword is found in the memory, the data corresponding to the keyword may be recognized as the data to be queried. According to some example embodiments, since the data in the memory is up-to-date, the latest data may be obtained based on a query result for the memory.

Figure 5:
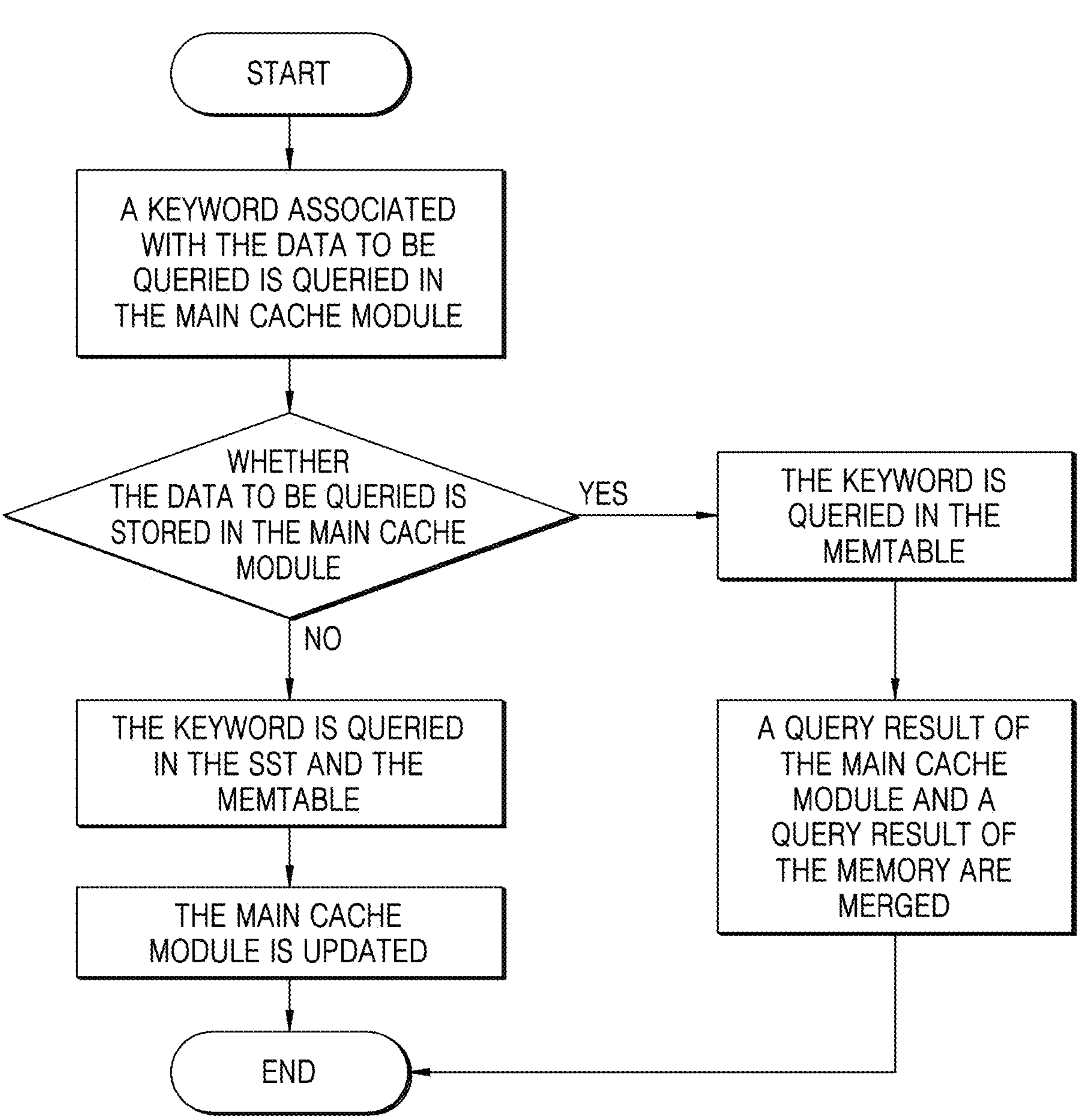
FIG. 5 is a flowchart of a data query operation according to some example embodiments.

To facilitate understanding of the data query method in the above example embodiments, a detailed description is provided in conjunction with FIG. 5. FIG. 5 is a flowchart of a data querying operation according to some example embodiments. As shown in FIG. 5, after a data query request is received, for example, after starting the data query process, the keywords associated with the data to be queried are queried in the main cache module in order to determine whether the data to be queried is included in the main cache module. When the keyword exists in the main cache module, e.g., the data to be queried exists in the main cache module, the keyword is continuously queried in the memory (e.g., the Memtable), e.g., the data corresponding to the keyword in the memory is queried, and the data corresponding to the keyword in the main cache module and the data corresponding to the keyword in the memory are merged. If the data corresponding to the keyword is found in the memory, the keyword found in the memory may prevail. When the keyword does not exist in the main cache module, e.g., the data to be queried does not exist in the main cache module, the keyword is queried in the SST files and the Memtable, e.g., the data corresponding to the keyword in the SST files and the Memtable is queried, and the data corresponding to the keyword in the memory still prevails, and the main cache module may need to be updated at this time, for example, an ordered view corresponding to the keyword is added to the main cache module.

In various example embodiments, in a case that a collection condition is met, ordered views with an access frequency less than a second specific threshold (such as a second dynamically determined or predetermined threshold) in the main cache module are determined, and the ordered views with the access frequency less than the second specific threshold and the ordered views with the collection mark are removed from the main cache module. According to some example embodiments, the ordered views with a low heat (low frequency access) and with the collection mark in the main cache module may be collected when the collection condition is met, so that the main cache module may have sufficient space, and the problem of large differences between access to hot data and access to cold data may be better accommodated in combination with suitable collection operations.

Figure 6:
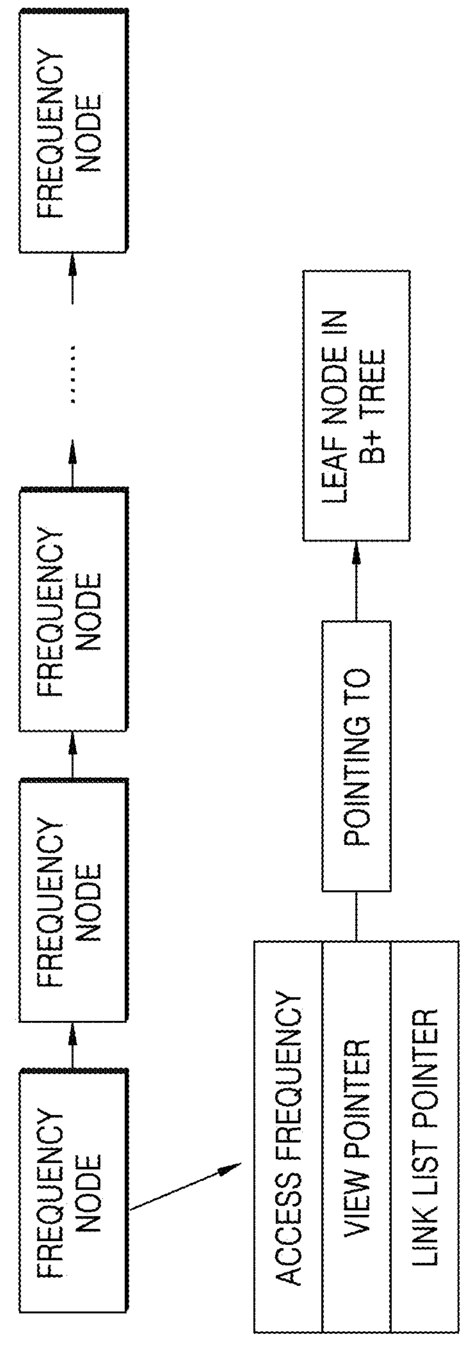
FIG. 6 is a schematic diagram of a frequency chain table according to some example embodiments.

Specifically, heats or access frequency of the ordered views in the main cache module may be stored in a link list (e.g., the link list may be called a frequency link list). A structure of the frequency link list is shown in FIG. 6. Each frequency node in the frequency link list may include an access frequency (Frequency Data), a view pointer, and a link list pointer of corresponding ordered view, where the view pointer is used to point to a leaf node in a B+ tree, e.g., to determine an ordered view to which the view pointer pointed, and the link list pointer is used to point to a location in the link list.

In various example embodiments, the collection condition includes a CPU utilization rate being below a third specific threshold, or receiving a temporary collection request. According to various example embodiments, the CPU may periodically collect an ordered view with low heat and an ordered view with a collection mark in the main cache module when the utilization rate is low, the CPU may also collect an ordered view with low heat and an ordered view with a collection mark in the main cache module according to any temporary need, thereby ensuring that the main cache module has sufficient space.

Specifically, various example embodiments may collect data based on heat statistics, and the data with low heat and the data marked with a collection marks is collected first. Also, this collecting operation may be divided into two categories, one may be seen as a periodic collecting process, e.g., periodically checking the CPU utilization rate and starting the collecting process when the utilization rate is low, which has a lower priority, and the other is a collecting operation that is triggered temporarily (e.g., when the main cache module is full but there is still new data to be written), which has a higher priority.

Figure 7:
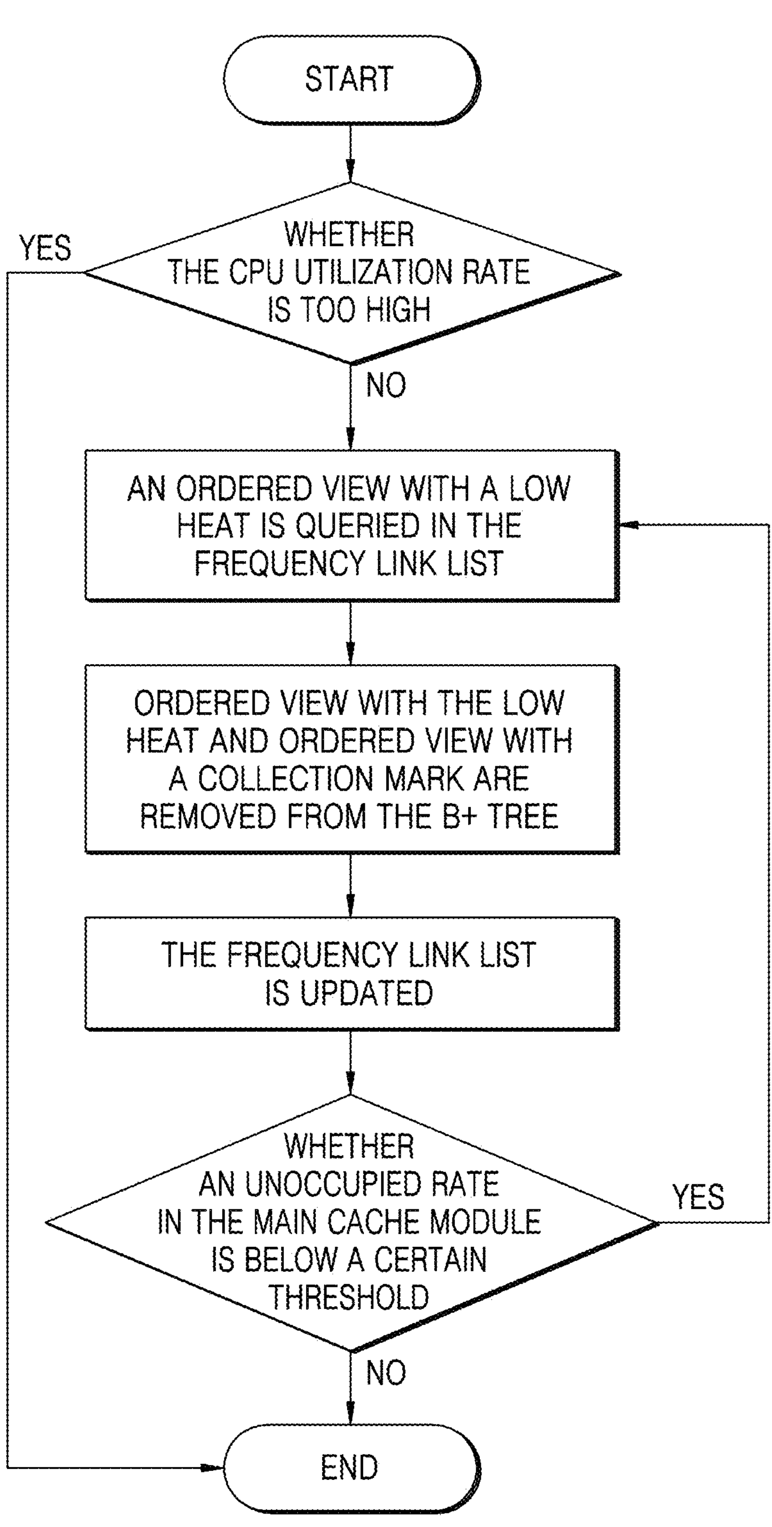
FIG. 7 is a flowchart of a collection operation according to some example embodiments.

For example, FIG. 7 is a flowchart of collecting operation according to an exemplary implementation of the present disclosure. As shown in FIG. 7, when the collecting condition is the CPU utilization rate being lower than a third specific threshold, whether the CPU utilization rate is too high may be periodically determined. If the CPU utilization rate is not high, an ordered view with low heat is queried in the frequency link list, and then the ordered view with low heat is removed from the B+ tree and the frequency link list is updated, such as by deleting information of an ordered view that has been deleted in the frequency link list. Then, whether an unoccupied rate in the main cache module is below a certain threshold is determined, if the unoccupied rate is below the certain threshold, the ordered view with low heat is continuously queried in the frequency link list and the following operations are continued until the unoccupied rate in the main cache module is below the certain threshold, so that the main cache module may be prevented from or reduced in likelihood of being filled up.

Figure 8:
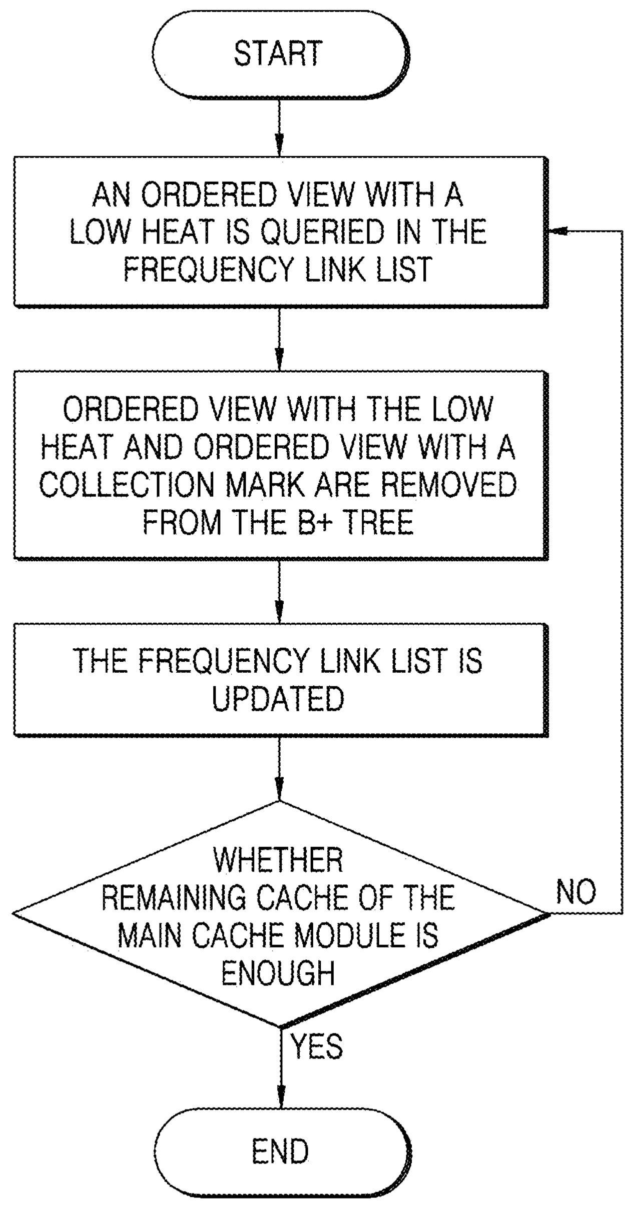
FIG. 8 is a flowchart of another collection operation according to some example embodiments.

For example, FIG. 8 is a flowchart of another collecting operation according to some example embodiments. As shown in FIG. 8, when the collecting condition is reception of a temporary collecting request, such as when receiving a request of writing data to the main cache module, the ordered view with low heat is queried in the frequency link list, and then the ordered view with low heat and an ordered view with the collection mark are removed from the B+ tree, and then the frequency link list is updated, such as by removing information of the removed ordered views in the frequency link list. Then, whether there is enough or sufficient remaining cache in the main cache module may be determined, such as whether the data to be written may be written to the remaining cache. If the remaining cache is not enough, the operations may be continued that the ordered views with low heat in the frequency link list is query and the subsequent operations continues until the remaining cache in the main cache module is sufficient.

According to some example embodiments, there is provided a storage device, wherein the storage device includes a memory, a hard disk and a memory expander including a main cache module, wherein the main cache module is used for storing ordered views that have been accessed historically and each of the ordered views includes a plurality of historical keywords, so that in a case that data is queried, a keyword associated with the queried data is queried first in the main cache module, the hard disk is used for storing keywords and data corresponding to the keywords, the memory is used for temporarily storing the keywords and the data corresponding to the keywords.

Figure 9:
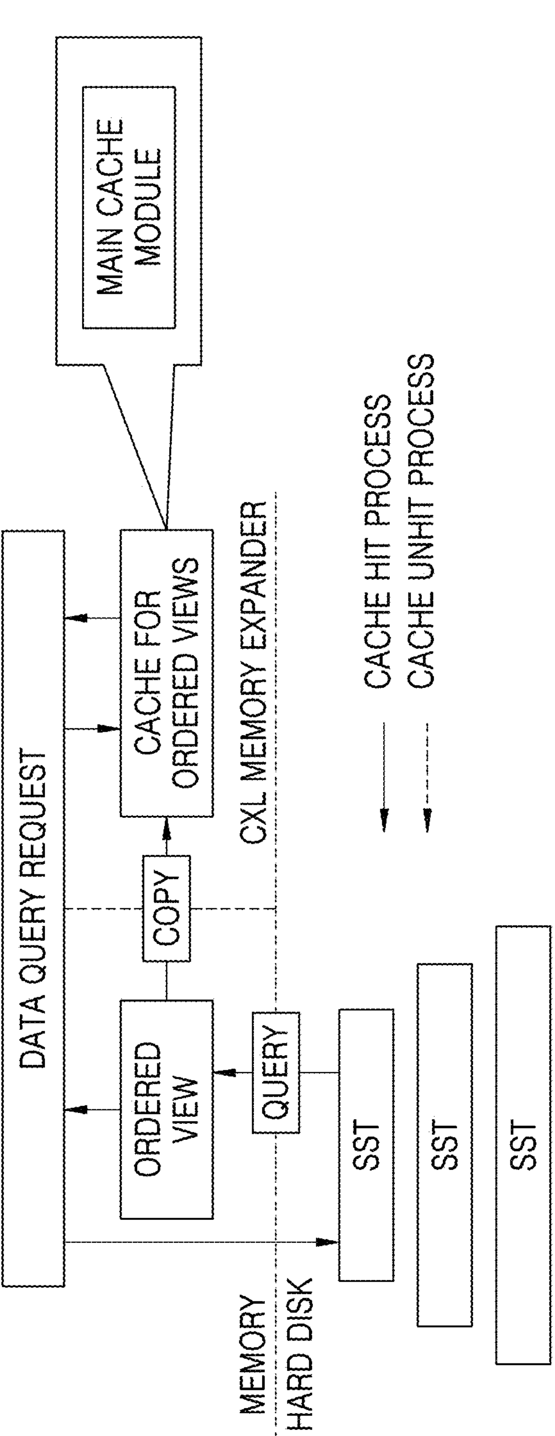
FIG. 9 is a schematic diagram of a storage device according to some example embodiments.

For example, FIG. 9 is a schematic diagram of a storage device according to some example embodiments. Referring to FIG. 9, various example embodiments may be applied to a RocksDB, e.g., a memory expander is added in addition to the hard disk and the memory, and the memory expander includes a main cache module, and a cache hit process and a cache miss process, e.g., a process in which the data to be queried is found in the main cache module and a process in which the data to be queried is not found in the main cache module are also given in the figure.

In various example embodiments, each of the ordered views further includes data corresponding to the plurality of historical keywords. According to some example embodiments, what is stored in the ordered view is not an index of the data but the specific data; for example, what is stored in the ordered view is no longer an offset address of the data but the data itself, so the ordered view is not updated during most compactions, thereby avoiding an updating problem. Because the ordered view in related technology stores the global index of the data corresponding to the keyword, and the global index needs to be updated constantly during the compactions, a large Memory Table (Memtable) may be used to reduce the number of compactions, but it will thus cause more serious write stall problems.

In various example embodiments, the ordered views that have been historically some are stored in the main cache module in a form of a B+ tree. According to various example embodiments, storing the ordered views in the form of B+ trees ensures that each data is read in a similar amount of time and read fast.

For example, taking the memory expander as a Compute Express Link (CXL) memory expander as an example, FIG. 2 is a schematic diagram of a structure of the main cache module according to some example embodiments. As shown in FIG. 2, the main cache module uses a B+ tree to store historical access records, e.g., historically accessed ordered views, and KV pairs are stored in ordered views on its leaf nodes, rather than offset addresses of the KV pairs, and a first key of an ordered view may be used as an index of the B+ tree, which is not limited thereto.

In various example embodiments, the memory expander/memory expander circuit further comprises an updating module or updating circuit for obtaining an ordered view corresponding to the keyword associated with the data to be queried in the hard disk or the memory based on the keyword associated with the data to be queried, and storing the ordered view in the main cache module, in a case that a historical keyword matching the keyword associated with the data to be queried is not found in the main cache module. According to some example embodiments, when the keyword of the data to be queried is not included in the main cache module, the ordered view corresponding to the keyword is obtained in the hard disk or the memory and updated to the main cache module to ensure that data in the main cache module is rich.

For example, suppose that a Key that is the keyword is 37, when the keyword is not found in the main cache module, a particular (e.g., predetermined or dynamically determined) number of Keys prior to 37 or a number of Keys following 37 may be obtained to generate an ordered view, and then the generated ordered view is stored in the main cache module, so that KV pairs in the ordered view in the main cache module may be directly queried when the KV pairs in the ordered view are accessed later, without generating the corresponding ordered view again.

In various example embodiments, the updating module is further used for obtaining a specific (e.g., predetermined or dynamically determined) number of target keywords in the hard disk based on the keyword associated with the data to be queried, wherein the target keywords include the keyword associated with the data to be queried and the target keywords are in-order, the specific number is less than a fourth specific threshold; and constructing, based on the s number of target keywords, the ordered view corresponding to the keyword associated with data to be queried based on the specific number of target keywords. According to various embodiments, the ordered view being too long may lead to an uneven heat distribution of the ordered views may be avoided or reduced in likelihood of occurrence. Example embodiments count heats by the ordered view, and thus if one ordered view is too long and contains too much data, it may be difficult to count relatively accurate heat of the one ordered view.

For example, the smallest unit of heat statistics in example embodiments is the ordered view rather than the Key, so there may be a problem of an uneven heat distribution in ordered views, and this problem may lead to deviation in heat statistics and/or may affect operation efficiency, so the overly long ordered view is generally be split. As shown in FIG. 3, this splitting operation will improve an accuracy of heat statistics, but will bring extra CPU consumption. Some example embodiments may limit the number of keywords in the ordered view when generating the ordered view, such as setting a fourth threshold to control the number of keywords in the ordered view. For example, it may still be assumed that the Key as keyword is 37 and the fourth specific threshold is four (4), e.g., the length of the ordered view is four. At this time, four Keys prior to the 37 or four Keys following the 37 may be obtained to generate the ordered view corresponding to the Key as keyword.

In various example embodiments, the updating module is further used for obtaining a proportion of specific keywords to all keywords in the memory in a case that content in the memory is written to the hard disk, wherein the specific keywords are keywords that are not present in the hard disk; specific ordered views corresponding to the specific keywords with a collection mark in the main cache module, and updating data corresponding to keywords other than the specific keywords in the memory to the main cache module, in a case that the proportion exceeds a first specific threshold; inserting the specific keywords into corresponding ordered views in the main cache module and updating the data corresponding to the keywords other than the specific keywords in the memory to the main cache module, in a case that the proportion does not exceed the first specific threshold. According to some example embodiments, in order to avoid or reduce that inserting too much new data causes some ordered views being too long and/or an extra CPU consumption is caused by splitting the ordered views, when updating all the data in memory to the main cache module, example embodiments may detect a proportion of new data when the data in the memory is written to the hard disk, and when the proportion of the new data is higher, the ordered view corresponding to the new data (such as the ordered view to be inserted) is marked as being collected and will be collected subsequently, and then new ordered views are re-introduced from the hard disk, and the introduced ordered views have a length limit and are not too long.

Figure 10:
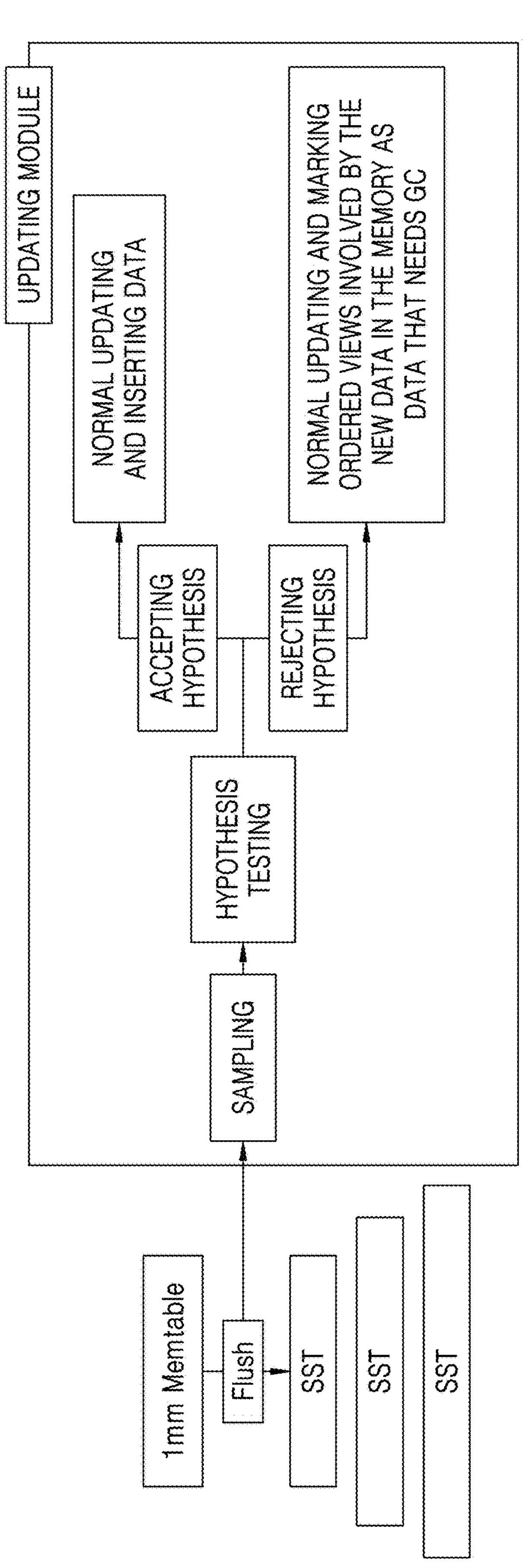
FIG. 10 is a schematic diagram of an updating module according to some example embodiments.

For example, various example embodiments may predict the proportion of the new data in the memory (e.g. the Memtable) by using a hypothesis testing. As shown in FIG. 10, the updating module samples the data in the memory.

Taking one of the samples as an example, a hypothesis testing is performed on the one sample to judge the one sample. A criterion for the hypothesis testing is that the proportion of the new data (e.g., new keywords) in the one sample is less than the first specific threshold. When it is predicted that the proportion of the new data in the one sample is high (e.g., the proportion exceeds the first specific threshold), only existing data (e.g., existing KV pairs) in the main cache module may be updated according to data in the memory, and ordered views involved by the new data in the memory are marked as data that needs GC (garage collection). When it is predicted that the proportion of the new data is low (e.g., the proportion does not exceed the first specific threshold), the existing data in the main cache module may be updated based on the data in the memory and the new data may be inserted into a corresponding ordered view in the main cache module. It should be noted that the above first specific threshold may be set according to a user's need, and example embodiments are not limited thereto.

In various example embodiments, the memory expander further includes a collecting module or collecting circuit and a hot data module or a hot data circuit, the hot data module is used for counting an access frequency of the each of the ordered views in the main cache module, and the collecting module is used for determining ordered views with an access frequency lower than a second specific threshold in the main cache module in a case that a collection condition is met, and removing the ordered views with the access frequency lower than the second specific threshold and ordered views with the collection mark from the main cache module. According to some example embodiments, the ordered views with low heat and with the collection mark in the main cache module may be collected when the collection condition is met, so that the main cache module may have sufficient space.

For example, a main function of the hot data module is to count the accessed status of respective ordered views in the main cache module, and all the heat statistics are done by recognizing the ordered view as the smallest unit, rather than the commonly used Key, which may reduce the extra CPU consumption. At the same time, the hot data module stores the access frequencies of ordered views in a link list, which may also be called a frequency link list. A structure of the frequency link list is shown in FIG. 6, each frequency node in the frequency link list may include an access frequency (Frequency Data), a view pointer, and a link list pointer of corresponding ordered view, where the view pointer is used to point to a leaf node in a B+ tree, e.g., to determine an ordered view to which the view pointer pointed, and the link list pointer is used to point to a location in the link list.

In various example embodiments, the collection condition includes a CPU utilization rate being below a third specific threshold, or reception of a temporary collection request. According to some example embodiments, the CPU may periodically collect an ordered view with low heat and an ordered view with a collection mark in the main cache module when the utilization rate is low, the CPU may also collect the ordered view with low heat and the ordered view with the collection mark in the main cache module according to any temporary need, thereby ensuring that the main cache module has sufficient space.

Figure 11:
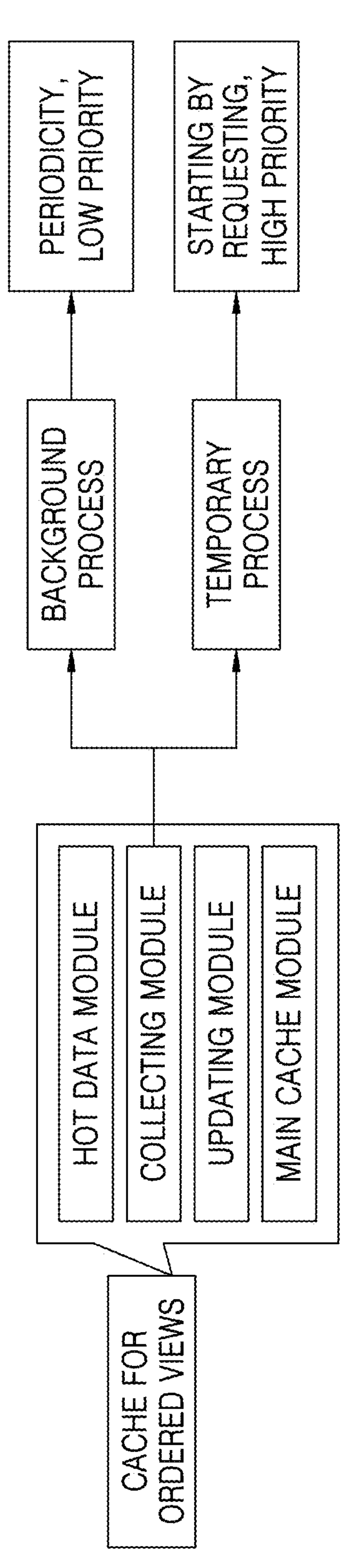
FIG. 11 is a schematic diagram of a collecting module according to some example embodiments.

For example, various example embodiments may collect data based on heat statistics, and data with a low heat and data marked with a collection marks is collected first. Also, this collecting operation may be split into two categories, one may be seen as a background process, e.g., periodically checking the CPU utilization rate and starting the collecting process when the utilization rate is low, which has a lower priority, and the other is a temporary process, e.g., a collecting operation that is triggered temporarily (e.g., when the main cache module is full but there is still new data to be written), which has a higher priority, as shown in FIG. 11.

In some example embodiments, the storage device introduces the memory expander based on the hard disk and the memory. The memory expander includes the main cache module, the updating module, the hot data module and the collecting module, and example embodiments may also give the process when the cache is hit and the cache is not hit, and all the data used by the modules are stored in a CXL memory expander. The four modules are designed to solve or at least partially solve or mitigate different problems and collaborate with each other, and the specific relationships between them may be shown in FIG. 12.

The following is a brief explanation of why the CXL memory expander is used as the memory expander according to various example embodiments.

There may be three storage media that may be used as a cache: a Dynamic Random Access Memory (DRAM), an Optane non-volatile storage, and a CXL Memory Expander.

Initially, based on current research on real-world workloads, it may be assumed that 20% of all data is hot data, which may make it difficult for existing DRAM specifications to store all the hot data, and if only a small portion of the hot data is stored, this may lead to frequent accesses that cannot hit the cache, which in turn leads to a large number of swap-out and/or swap-in actions in the cache, thereby causing unnecessary I/O accesses. Additionally or alternatively, for the Optane, the performance of which decreases significantly when small data blocks are accessed, and the KV pairs in real environments are very small, so if the Optane is used to store cache data, it may lead to a significant performance degradation of the Optane and cannot achieve an expected result.

However, if the cache data is stored in CXL Memory Expander, initially, the CXL Memory Expander may provide far more storage space than ordinary memory; additionally or alternatively, because the CXL Memory Expander is made based on DRAM media, there is no problem or a reduced problem that reading and writing for small data block will lead to the performance degradation. Additionally or alternatively, example embodiments may be started or terminated at any time during running of the RocksDB, so the problem of data loss after power down will not be severe, because cache data stored in CXL Memory Expander does not need to wait for recovery after the RocksDB restarts, and the cache may be reconstructed during an operation of the RocksDB.

According to some example embodiments, there is provided a data query device applied to a storage device, the storage device includes a memory, a hard disk, and a memory expander, and the memory expander includes a main cache module.

Figure 13:
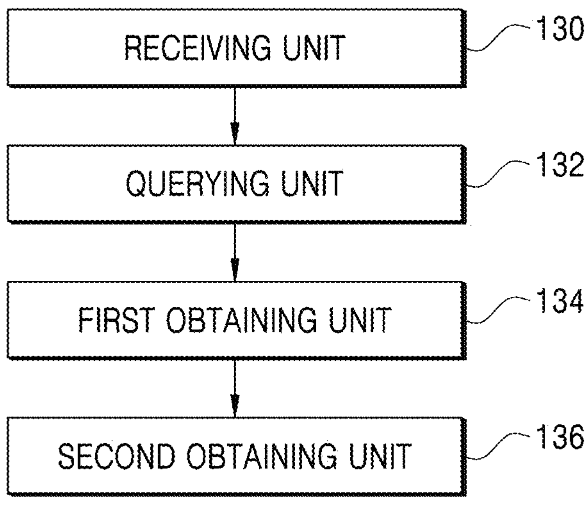
FIG. 13 is a block diagram of a data query device according to various example embodiments.

FIG. 13 is a block diagram of a data query device according to some example embodiments. Referring to FIG. 13, the data query device includes: a receiving unit 130 or receiving circuit 130 configured to receive a data query request sent by a sender, wherein the data query request carries a keyword associated with the data to be queried; a querying unit 132 or a querying circuit 132 configured to query the keyword in the main cache module, wherein ordered views that have been accessed historically are stored in the main cache module and each of the ordered views comprises a plurality of historical keywords; a first obtaining unit 134 or first obtaining circuit 134 configured to query the data corresponding to the keyword in the hard disk and in the memory based on the keyword and obtaining the data to be queried, in a case that a historical keyword matching the keyword is not found in the main cache module; a second obtaining unit 136 or second obtaining unit 136 configured to query data corresponding to the keyword in the memory based on the keyword and obtain the data to be queried, in a case that the historical keyword matching the keyword is found in the main cache module.

In various example embodiments, the each of the ordered view further includes data corresponding to the plurality of historical keywords.

In various example embodiments, the first obtaining unit 134 is further configured to: in the case that the historical keyword matching the keyword is not found in the main cache module, after the obtaining the data to be queried, obtain an ordered view corresponding to the keyword in the hard disk or the memory, based on the keyword; and store the ordered view in the main cache module.

In various example embodiments, the first obtaining unit 134 is further configured to: obtain, based on the keyword, a specific number of target keywords in the hard disk, wherein the target keywords include the keyword and the target keywords are ordered, the specific number is less than a fourth specific threshold; construct, based on the specific number of target keywords, the ordered view corresponding to the keyword.

In various example embodiments, the data query device further includes an updating unit or updating circuit configured to: in a case that content of the memory written to the hard disk, obtain a proportion of specific keywords to all keywords in the memory, wherein the specific keywords are keywords that are not present in the hard disk; in a case that the proportion exceeds a first specific threshold, mark ordered views corresponding to the specific keywords with a collection mark in the main cache module, and update data corresponding to keywords in the memory other than the specific keywords to the main cache module; in a case the proportion does not exceed the first specific threshold, insert the specific keywords into corresponding ordered views in the main cache module, and update the data corresponding to the keywords other than the specific keywords in memory to the main cache module.

In various example embodiments, the data query device further includes a collection unit or collection circuit configured to: in a case that a collection condition is met, determine ordered views with an access frequency lower than a second specific threshold in the main cache module, remove, from the main cache module, the ordered views with the access frequency lower than the second specific threshold and ordered views with the collection mark.

In various example embodiments, the collection condition includes a CPU utilization rate being below a third specific threshold, or reception of a temporary collection request.

In various example embodiments, the ordered views that have been accessed historically are stored in the main cache module in a form of a B+ tree.

In various example embodiments, the first obtaining unit 134 and the second obtaining unit 136 are further configured to: in a case that the data corresponding to the keyword is found in the memory, recognize the data corresponding to the keyword as the data to be queried.

It should be understood that each unit/module in the data query method and the data query device, the storage device and the electronic device according to various example embodiments may be implemented as a hardware component and/or a software component. According to the processing executed by each defined unit/module, those of ordinary skill in the art may, for example, use a Field-Programmable Gate Array (FPGA) or an Application-Specific Integrated Circuit (ASIC) to implement each unit/module.

According to various example embodiments, there is provided a computer-readable storage medium storing a computer program, wherein when the computer program is executed by a processor, implements the data query method described in the present disclosure.

For example, the data query method according to various example embodiments may be written as a computer program, a code segment, an instruction, or any combination thereof, and recorded, stored, or fixed in one or more non-transitory computer-readable storage media or on one or more non-transitory computer-readable storage media. The computer-readable storing medium is any data storage device that may store data read out by a computer system. Examples of the computer-readable storing medium include: a read-only memory, a random-access memory, a CD-ROM, a magnetic tape, a floppy disk, an optical data storage apparatus and a carrier (such as data transmission through Internet through a wired or wireless transmission path).

According to various example embodiments disclosure, there is provided an electronic apparatus, wherein the electronic apparatus includes at least one processor; and at least one memory storing computer executable instructions, wherein the computer executable instructions, while being executed by the at least one processor, cause the at least one processor (or the electronic apparatus) to execute the data query method described in various embodiments.

For example, the electronic apparatus may broadly be a tablet computer, a smart phone, a smart watch, or any other electronic devices with necessary computing and/or processing capabilities. In one embodiment, the electronic device may include a processor, a memory, a network interface, a communication interface, etc. connected through a system bus. The processor of the electronic device may be used to provide necessary computing, processing and/or controlling capabilities. The memory of the electronic device may include a non-volatile storage medium and an internal memory. An operating system, a computer program, etc. may be stored in or on the non-volatile storage medium. The internal memory may provide an environment for execution of the operating system and the computer program in the non-volatile storage medium. The network interface and communication interface of the electronic apparatus may be used to connect and communicate with external devices through a network, such as a wired and/or wireless network.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Example embodiments are not necessarily mutually exclusive with one another. For example, some example embodiments may include one or more features described with reference to one or more figures, and may also include one or more other features described with reference to one or more other figures.

What is claimed is:

1. A data query method, wherein the data query method is applied to a storage device comprising a memory, a hard disk, and a main cache, the data query method comprising:

receiving a data query request carrying a keyword associated with data to be queried;

querying the keyword in the main cache, wherein ordered views that have been historically accessed are stored in the main cache and each of the ordered views comprises a plurality of historical keywords;

in response to a historical keyword among the plurality of historical keywords matching the keyword not being found in the main cache, querying the data corresponding to the keyword in the hard disk and in the memory based on the keyword and obtaining the data to be queried;

in response to the historical keyword matching the keyword being found in the main cache, querying the data corresponding to the keyword in the memory based on the keyword and obtaining the data to be queried, in response to content of the memory being written to the hard disk, obtaining a proportion of specific keywords to all keywords in the memory, wherein the specific keywords are other keywords that are not present in the hard disk, and in response to the proportion exceeding a first threshold, marking specific ordered views corresponding to the specific keywords with a collection mark in the main cache, and updating the data corresponding to the other keywords in the memory other than the specific keywords to the main cache.

2. The data query method of claim 1, wherein the each of the ordered views further comprises historical data corresponding to the plurality of historical keywords.

3. The data query method of claim 2, wherein, in response to the historical keyword matching the keyword not being found in the main cache, after the obtaining the data to be queried, the method further comprises:

obtaining an ordered view corresponding to the keyword in at least one of the hard disk or the memory, based on the keyword; and storing the ordered view in the main cache.

4. The data query method of claim 3, wherein the obtaining the ordered view corresponding to the keyword based on the keyword comprises:

obtaining, based on the keyword, a plurality of target keywords in the hard disk, wherein the plurality of target keywords comprise the keyword and the plurality of target keywords are listed in numerical order, and a number of the plurality of target keywords is less than a threshold; and constructing, based on the number of the plurality of target keywords, the ordered view corresponding to the keyword.

5. The data query method of claim 2, further comprising:

in response to the proportion not exceeding the first threshold, inserting the specific keywords into corresponding other ordered views in the main cache, and updating the data corresponding to the other keywords other than the specific keywords in the memory to the main cache.

6. The data query method of claim 5, wherein the data query method further comprises:

in response to a collection condition being met, determining first ordered views with an access frequency lower than a second threshold in the main cache, removing, from the main cache, the first ordered views with the access frequency lower than the second threshold and second ordered views with the collection mark.

7. The data query method of claim 6, wherein the collection condition comprises at least one of a CPU utilization rate being below a third threshold, or reception of a temporary collection request.

8. The data query method of claim 1, wherein the ordered views that have been accessed historically are stored in the main cache in a B+ tree.

9. The data query method of claim 1, wherein the obtaining the data to be queried comprises:

in response to the data corresponding to the keyword being found in the memory, recognizing the data corresponding to the keyword as the data to be queried.

10. A storage device, wherein the storage device comprises a memory, a hard disk and a main cache, wherein the main cache is configured to store ordered views that have been accessed historically and each of the ordered views comprises a plurality of historical keywords, the hard disk is configured to store keywords and data corresponding to the keywords, the memory is configured to store keywords and the data corresponding to the keywords, and wherein the storage device is configured so that:

in response to receiving a data query request carrying a keyword associated with the data to be queried, the keyword in the ordered views stored in the main cache is queried first, in response to the keyword not matching any of the plurality of historical keywords in the main cache, the data corresponding to the keyword in the hard disk and in the memory is queried based on the keyword and the data to be queried is obtained; and in response to the keyword matching one of the plurality of historical keywords in the main cache, the data corresponding to the keyword in the memory is queried based on the keyword and the data to be queried is obtained, wherein the main cache further comprises updating circuitry, and the updating circuitry is configured to;

in response to content in the memory being written to the hard disk, obtain a proportion of specific keywords to all keywords in the memory, wherein the specific keywords are other keywords that are not present in the hard disk, and in response to the proportion exceeding a first threshold, mark ordered views corresponding to the specific keywords with a collection mark in the main cache, and update data corresponding to other keywords other than the specific keywords in the memory to the main cache.

11. The storage device of claim 10, wherein the each of the ordered views that have been accessed historically further comprises data corresponding to the plurality of historical keywords.

12. The storage device of claim 11, wherein the main cache is included in a memory expander circuit, and the memory expander circuit further comprises the updating circuitry configured to obtain an ordered view corresponding to the keyword associated with the data to be queried in the hard disk or the memory, and to store the ordered view in the main cache, in response to a historical keyword matching the keyword associated with the data to be queried not being found in the main cache.

13. The storage device of claim 12, wherein the updating circuitry is further configured to:

obtain a plurality of target keywords in the hard disk based on the keyword associated with the data to be queried, wherein the plurality of target keywords comprise the keyword associated with the data to be queried and the plurality of target keywords are listed in numerical order, and a number of the plurality of target keywords is less than a fourth threshold; and construct, based on the number of the plurality of target keywords, the ordered view corresponding to the keyword associated with the data to be queried.

14. The storage device of claim 12, wherein the updating circuitry is further configured to in response to the proportion not exceeding the first threshold, insert the specific keywords into corresponding ordered views in the main cache and update the data corresponding to the other keywords other than the specific keywords in the memory to the main cache.

15. The storage device of claim 14, wherein the memory expander circuit further comprises a collecting circuit and a hot data circuit, the hot data circuit is configured to count an access frequency of the each of the ordered views in the main cache, and in response to a collection condition being met, the collecting circuit is configured to determine first ordered views with an access frequency lower than a second threshold in the main cache, and to remove the first ordered views with the access frequency lower than the second threshold and the ordered views with the collection mark from the main cache.

16. The storage device of claim 15, wherein the collection condition comprises at least one of a CPU utilization rate being below a third threshold, or reception of a collection request.

17. The storage device of claim 10, wherein the ordered views that have been accessed historically are stored in the main cache in a B+ tree.

18. A data query device, wherein the data query device is applied to a storage device comprising a memory, a hard disk and a main cache, the data query device comprises:

a receiving circuit configured to receive a data query request sent by a sender, wherein the data query request carries a keyword associated with first data to be queried;

a querying circuit configured to query the keyword in the main cache, wherein ordered views that have been accessed historically are stored in the main cache and each of the ordered views comprises a plurality of historical keywords;

a first obtaining circuit configured to query the first data corresponding to the keyword in the hard disk and in the memory based on the keyword and obtaining the first data to be queried, in response to a historical keyword matching the keyword not being found in the main cache; and a second obtaining circuit configured to query second data corresponding to the keyword in the memory based on the keyword and obtaining the second data to be queried, in response to the historical keyword matching the keyword being found in the main cache, wherein the first obtaining circuit is configured to:

in response to content in the memory being written to the hard disk, obtain a proportion of specific keywords to all keywords in the memory, wherein the specific keywords are other keywords that are not present in the hard disk, and in response to the proportion exceeding a first threshold, mark ordered views corresponding to the specific keywords with a collection mark in the main cache, and update data corresponding to other keywords other than the specific keywords in the memory to the main cache.

19. A computer-readable storage medium storing a computer program, that when executed by a processor, implements the data query method according to claim 1.

20. An electronic apparatus, comprising:

at least one processor; and at least one memory storing computer-executable instructions, wherein the computer-executable instructions, when executed by the at least one processor, cause the electronic apparatus to perform the data query method of claim 1.

* * * * *